XR 2,510,106

SEARCH ROOM

SUBSTITUTE FOR MISSING XR

June 6, 1950

F. C. P. HENROTEAU 2,510,106

CATOPTRIC TELEVISION PROJECTOR HAVING TUBE SCREEN AND OBJECT SURFACE CONNECTED BY LIGHT-CONDUCTING FILAMENTS

Filed May 31, 1946

3 Sheets-Sheet 1

INVENTOR
FRANCOIS C. P. HENROTEAU

BY [signature]

ATTORNEY

June 6, 1950 F. C. P. HENROTEAU 2,510,106

CATOPTRIC TELEVISION PROJECTOR HAVING TUBE SCREEN AND OBJECT SURFACE CONNECTED BY LIGHT-CONDUCTING FILAMENTS

Filed May 31, 1946 3 Sheets-Sheet 2

INVENTOR
FRANCOIS C. P. HENROTEAU

BY [signature]

ATTORNEY

June 6, 1950 F. C. P. HENROTEAU 2,510,106

CATOPTRIC TELEVISION PROJECTOR HAVING TUBE SCREEN AND OBJECT SURFACE CONNECTED BY LIGHT-CONDUCTING FILAMENTS

Filed May 31, 1946 3 Sheets-Sheet 3

INVENTOR
FRANCOIS C. P. HENROTEAU

BY [signature]

ATTORNEY

Patented June 6, 1950

2,510,106

UNITED STATES PATENT OFFICE 2,510,106

CATOPTRIC TELEVISION PROJECTOR HAVING TUBE SCREEN AND OBJECT SURFACE CONNECTED BY LIGHT-CONDUCTING FILAMENTS

François Charles Pierre Henroteau, Fort Wayne, Ind., assignor, by mesne assignments, to Farnsworth Research Corporation, a corporation of Indiana Application May 31, 1946, Serial No. 673,530

4 Claims. (Cl. 178—7.5)

This invention relates to optical systems and particularly to optical systems for enlarging images in a television projection system.

There are two major requirements for optical systems susceptible of use in enlarging images such as those produced on the screen of a cathode ray tube in a television system. In such cases, advantage may not be taken of the time element as in systems for making photographic enlargements, for example. In this latter type of system where time is not of the essence, deficiencies of the optical system may be compensated by lengthening the time of exposure. However, in television systems the images must be created in a relatively small finite interval of time usually of the order of 1/60 of a second according to present standards.

The first requirement of any optical system for reproducing an image, either in an enlarged or a reduced form, is that the system be of such a character that the distortions which may be introduced are minimized. This, of course, is an essential requirement where faithfulness of reproduction is required.

The second major requirement of an optical system for use in reproducing an image where time is of the essence is that it make the most efficient use possible of the light available in the original image. This second requirement is one which heretofore has impeded the development of the television projection art. It obviously is of no practical value to produce an enlarged image on a viewing screen of a television system if that image is not reasonably bright.

Most of the optical systems which have been used in television projectors heretofore have been of such a character that the light which is available in the original image formed on the screen of the cathode ray tube has not been used at very great efficiency. An adaptation of the optical system used in the so-called Schmidt camera has been used in television projectors with a fair measure of success. By its use it has been possible to project onto a viewing screen a reasonably undistorted image of the television subject and having such dimensions that it may be viewed simultaneously by several observers. The brightness of the enlarged image, however, is not as great as might be desired. Consequently, for optimum results, the enlarged picture should be viewed in a partially darkened room.

A novel optical system comprising a plurality of spherical optical surface members, all of which are substantially concentric, forms the subject matter of a copending application of F. C. P. Henroteau having Serial No. 608,450, filed August 2, 1945, and entitled "Concentric optical system." This concentric optical system constitutes a substantial improvement over optical systems of the prior art, including that embodied in the Schmidt camera, in that it utilizes light from a much wider angle and focuses this light so as to produce a bright image which is free of distortions such as spherical and chromatic aberrations, coma and the like.

For use in a television projection receiver, however, a concentric optical system in accordance with the subject matter of the copending application referred to may be improved. In accordance with the disclosure of the basic principles underlying the concentric optical system, the object to be reproduced should have a substantially spherical shape. Similarly, the screen or equivalent device upon which the image is reproduced also should be substantially spherical. If the object to be reproduced is formed directly on the screen of a cathode ray tube, it is necessary, in order to fulfill the requirement of the concentric optical system that the object have a substantially spherical shape, that the face of the cathode ray tube be made concave as viewed from the outside of the tube. It is preferable to make cathode ray tubes having either a screen which is slightly convex, as viewed from the outside, or plane. In addition, it is desirable to project the enlarged image onto a screen which is substantially flat rather than upon one which has a spherical configuration.

Another practical limitation of the basic concentric optical system is its relatively large size when used in air. Great simplification of the design of home television receivers, for example, may be effected by making the optical system of relatively small size.

It, therefore, is an object of the present invention to provide, in an optical system comprising a plurality of concentric spherical optical surface members, facilities for adapting such a system conveniently for use in home television receivers.

Another object of the invention is to provide an improved concentric optical system, whereby it may be used to optimum advantage in a television receiver comprising standard components such as convex or flat-faced cathode ray tubes and plane viewing screens.

Still another object of the invention is to provide an improved concentric optical system wherein the system is of relatively small size.

A further object of the invention is to provide an improved optical system wherein the available light is used at maximum efficiency to reproduce an enlarged image.

In accordance with the present invention, there is provided an image projector susceptible of use in a television receiver which comprises a source of a light image. In a television system, this source may be a cathode ray tube having an image reproducing screen of predetermined surface area and of substantially any configuration. In addition, there is provided a viewing screen which, in the case where image enlargement is desired, has a larger surface area than that of the light image source such as the cathode ray tube screen. Means are provided in accordance with this invention for transferring the image of the light source to an object surface member having a substantially spherical configuration. There also is provided between the object surface member and a substantially spherical image surface member which, in some cases may be the viewing screen, a plurality of substantially spherical optical surface members. All of the spherical surfaces have substantially the same center of curvature. The optical surface members may be all of the reflecting type, in which case the concentric optical system is a catoptric one, or some of the optical surface members may be light reflecting and others light refracting, in which case the system is a catadioptric one, or these optical surface members all may be of the light refracting type, in which case the concentric system is a dioptric one.

In one form of the present invention, the image transferring means located between the light image source and the spherical object surface member comprises a multiplicity of light conducting filaments of which there is at least one for every elemental area of the image. These light conducting filaments are grouped together to form a relatively compact structure, one end of which is located adjacent to the light image source and the other end of which terminates substantially in the spherical object surface. The present invention also contemplates that another group of light conducting filaments may be employed to transfer the enlarged image formed on the spherical image surface member to a substantially plane viewing screen.

Another object of the invention, therefore, is to provide a novel method of producing a filamentary light conducting structure of the character described.

Further, in accordance with another embodiment of this invention, the spherical image surface member of the concentric optical system may be considerably smaller in area than the area of the light image source which, in the case of a television system may be the fluorescent screen of a cathode ray tube. In this form of the invention, a filamentary light conducting structure may be used to transfer the image from the source thereof to the spherical object surface member of the optical system in reduced size. If it is desired to effect the same order of image enlargement from the image source to the viewing screen, as in the previous case, the concentric optical system is designed to effect a somewhat greater magnification of the image appearing on the spherical image surface member. However, it will be demonstrated that the concentric optical system required for such a purpose will have much smaller over-all dimensions than in the previous instance.

Additionally, in accordance with this invention, there is disclosed a process for making a filamentary light conducting structure such as that described. In general this process comprises the steps of selectively directing radiant energy such as ultraviolet light through portions of a nonpolymerized substance whereby the portions of the substance which are subjected to the radiant energy are polymerized. The remaining unpolymerized portions are then dissolved leaving a multiplicity of filaments having the desired size and shape.

For a better understanding of the invention, together with other and further objects thereof, reference is made to the following description, taken in connection with the accompanying drawings, and its scope will be pointed out in the appended claims.

Figure 1:
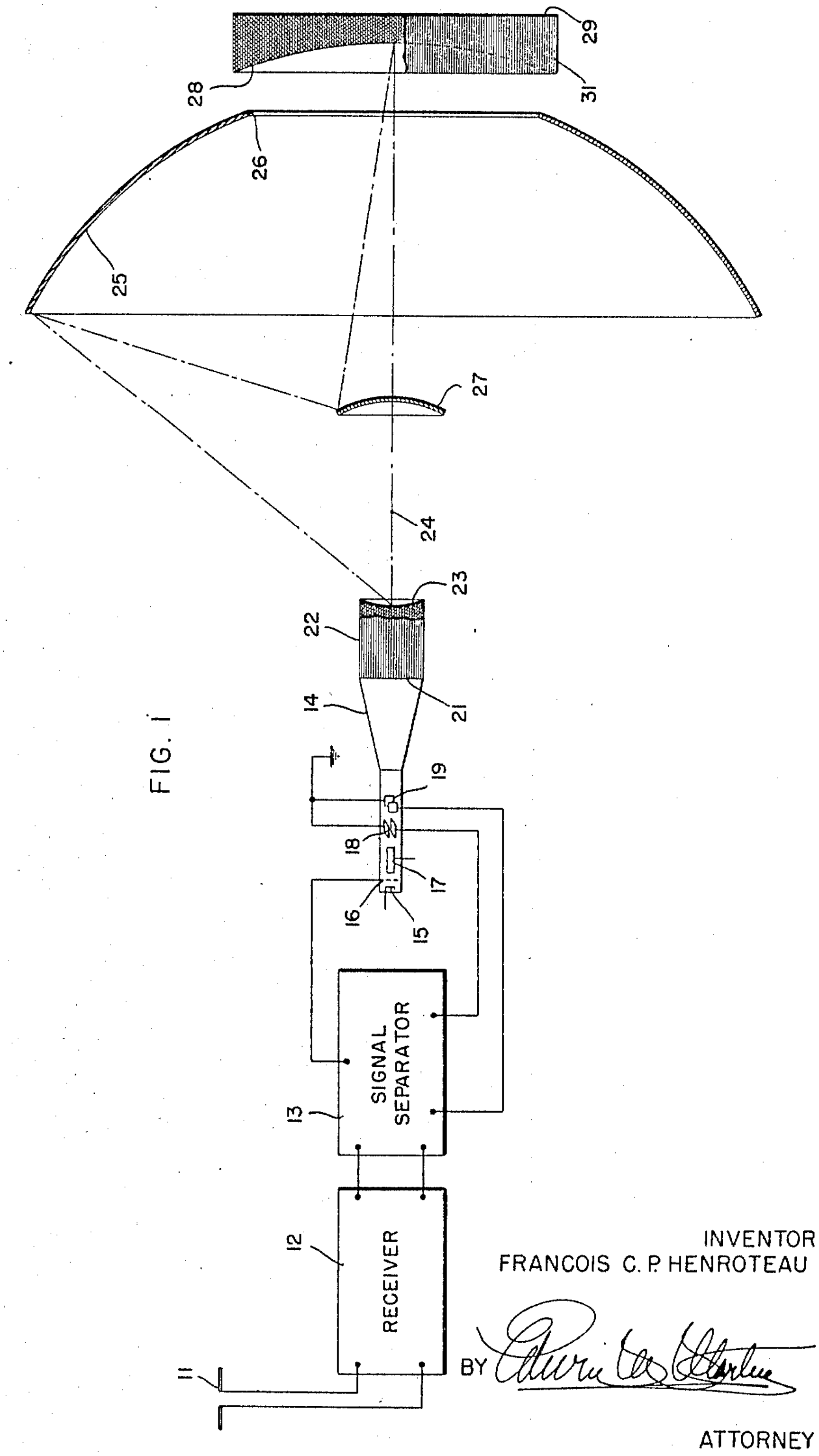
Fig. 1 is a schematic representation of a television receiver provided with an optical projection system embodying the present invention.

Reference first will be made to Fig. 1 of the drawings. There is illustrated a television receiving system embodying one form of the invention. The composite television signals are intercepted by a dipole antenna 11 which is coupled to a conventional receiver 12. The receiver, which is provided with the usual amplifying and demodulating apparatus, is coupled to a signal separator 13 wherein the video signals and the system control signals such as the horizontal and vertical synchronizing pulses are separated.

The apparatus also includes a cathode ray tube 14. This tube includes a conventional electron gun structure including a cathode 15, an intensity control grid 16 and a beam forming electrode 17. The control grid 16 is coupled to the signal separator for the impression thereon of the video and blanking signals. The cathode ray tube also includes a pair of vertical deflecting plates 18 and a pair of horizontal deflecting plates 19. These pairs of deflecting plates also are coupled to the signal separator for the impression thereon of saw-tooth deflection voltages whereby the electron beam is deflected systematically both horizontally and vertically. The tube also is provided with a fluorescent screen 21 which is adapted to be scanned by the electron beam. In this manner a television image is reproduced on the fluorescent screen of the tube.

There also is provided a group of light conducting rods or filaments 22. These filamentary light conductors are bunched together so that they lie substantially parallel. One end of each of the light conductors is placed in close proximity to the fluorescent screen 21 of the cathode ray tube. The other ends of the light conductors are cut so that they define a spherical surface 23. There is at least one filamentary light conductor for every elemental picture area. The light conductors may be made of translucent material such as quartz or Pyrex glass, certain plastics such as Lucite and the like.

The spherical surface 23 has a center of curvature 24 and forms a so-called object surface member of a concentric catoptric or reflecting optical system. This optical system also includes a substantially spherical concave light reflector 25 also having the center of curvature 24. The concave reflector 25 is provided with an axially disposed aperture 26. Additionally, the catoptric system includes a convex light reflector 27 located between the concave reflector 25 and the object surface 23. The convex reflector also has the center of curvature 24. Finally, the catoptric system includes a substantially spherical image surface 28 which has the same center of curvature 24 as all other spherical members. A substantially plane viewing screen 29 is spaced somewhat from the spherical surface 28. A second group of filamentary light conductors 31 arranged parallel to one another is used to join the spherical image surface 28 and the viewing screen 29. For this purpose, these light conductors each terminate in the plane of the viewing screen and the other ends of these conductors are located in the spherical image surface 28.

Referring now to the operation of the apparatus shown in Fig. 1, a light image representing the television subject is reproduced on the fluorescent screen 21 of the cathode ray tube in a conventional manner. Substantially all of the light issuing from each elemental area of this screen enters one of the filamentary light conductors 22. This light is conducted by what is known as total internal reflection to the other end of each of the light conductors from which it issues to form a light image of the television subject in the spherical object surface 23.

A large proportion of all of the rays emanating from each elemental area of the object surface 23 is directed onto the concave reflecting surface of the reflector 25. These rays are then reflected and impinge upon the convex surface of the reflector 27. Finally, the light rays are directed onto the spherical image surface 28. As demonstrated in the copending Henroteau patent application referred to, such an optical system is capable of utilizing substantially all of the light issuing in a relatively large solid angle from each elemental area of the object surface 23 and of accurately focusing this light in the image surface 28 without appreciable distortion of any kind. As illustrated in Fig. 1 of the present application, the catoptric system is shown somewhat to the scale required to produce a magnification of five between the object surface 23 and the image surface 28. In view of the fact that such a system is capable of using such a relatively large proportion of the available light, the enlarged image which is produced is considerably brighter than it is possible to produce by the use of any known prior art optical enlarging system. Finally, to conserve substantially all of the light produced in the image surface 28, the filamentary light conductors 31 are employed to conduct the light to the plane viewing screen 29.

While the system described in connection with Fig. 1 is capable of producing satisfactory results, it has what is for some installations such as home television receivers the disadvantage that the dimensions of the catoptric system are larger than is ordinarily considered practical. However, the present invention is susceptible of embodiment in apparatus which does not have this disadvantage. It is based on the principle that where an optical system is to be used for enlarging, the dimensions of this system are of the same order of magnitude as the dimensions of the object to be enlarged. In other words, if an image having a size which may be represented by the number 4 is to be magnified four times to produce an enlarged image having a size which may be represented by the number 16, the optical system required to effect such a result will have dimensions of the order of magnitude of 4. If, however, the size of the original image is such that it may be represented by the number 1, and it is desired to magnify this image to have a size which may be represented by the number 16, a magnification of sixteen will be necessary, but the dimensions of the optical system required for making such an enlargement will be of the order of magnitude of 1.

It, therefore, is proposed to first reduce the size of the television image produced on the screen of the cathode ray tube and then to enlarge it to the desired size for projection upon the viewing screen by means such as a catoptric system.

Figure 2:
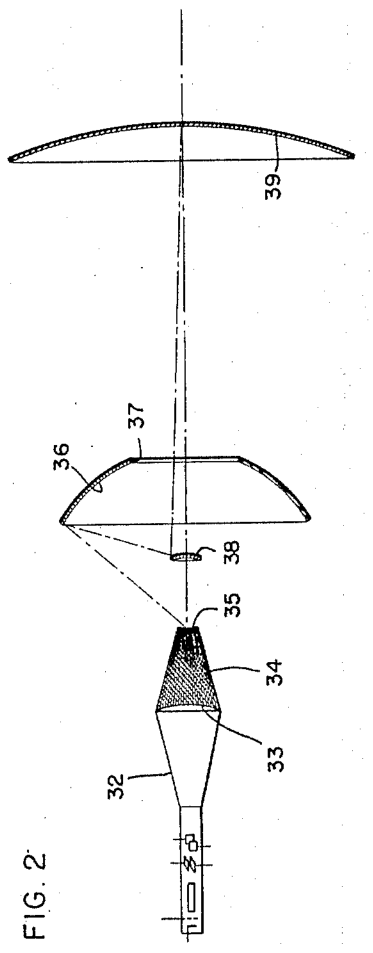
Fig. 2 is an illustration of the image reproducing portion of a television receiver embodying another form of the invention.
Figure 3:
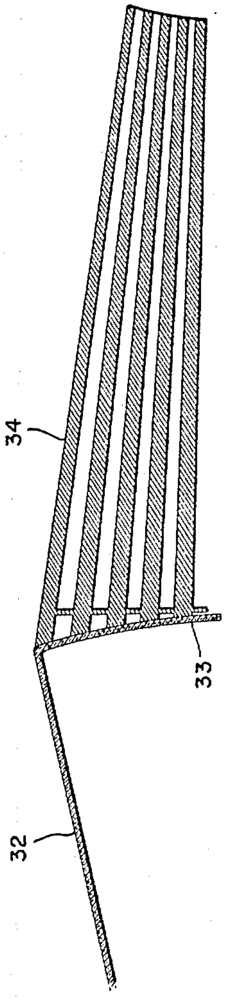
Fig. 3 is an enlarged view of a portion of the apparatus shown in Fig. 2 and illustrates in detail the character of the filamentary light conductors and their relationship to a cathode ray tube screen.

Apparatus embodying the invention and operating according to the described principle is illustrated in Fig. 2 to which reference will now be made. This apparatus includes an image reproducing tube 32 which, as illustrated, is provided with a convex face, upon the interior surface of which is formed a fluorescent screen 33. A group of filamentary light conductors 34 is located so that one end of each of the conductors is closely adjacent to the face of the image reproducing tube. In the present instance, these light conductors are frustro-conically shaped and are located with the large end of the group against the face of the tube 32. The configuration and arrangement of the light conductors is better illustrated in Fig. 3 which is an enlarged view of a portion of the apparatus shown in Fig. 2. The small end of the group of light conductors is arranged to define a spherical surface 35 which is considerably smaller in area than the area of the fluorescent screen 33. As illustrated, the area of the spherical surface 35 is approximately one-fourth of the area of the fluorescent screen. The spherical surface 35 forms the object surface member of a catoptric system which comprises, in addition, a concave spherical reflector 36 having a centrally located aperture 37 and a convex reflector 38. Finally, there is provided an image surface member such as a viewing screen 39 which in the present instance is substantially spherically shaped and has a surface area approximately sixteen times the area of the object surface 35. Obviously, if desired, there may be employed a group of filamentary light conductors in conjunction with the image surface member 39 to form the enlarged image on a plane viewing screen much in the manner illustrated in Fig. 1.

In operation, the optical image formed on the fluorescent screen 33 is transferred to the object surface member 35 of the catoptric system by means of the filamentary light conductors 34. By reason of the described configuration and arrangement of these light conductors, the image is reduced in size to approximately one-fourth of its original size. However, in effecting the image reduction, there is substantially none of the light emanating from the fluorescent screen lost in the transfer to the object surface 35. Consequently, the total light of the image at the fluorescent screen 33 and at the object surface 35 is approximately equal. The reduced size image is magnified by means of the described catoptric system approximately sixteen times and is projected onto the viewing screen 39. In view of the relatively high efficiency of the catoptric system, a large proportion of the light of the original reproduced image is utilized to form the enlarged image on the viewing screen.

For the purpose of making a comparison, the fluorescent screen 33 and the viewing screen 39 of Fig. 2 have been made substantially of the same size as the fluorescent screen 21 and the viewing screen 29 of Fig. 1. It is readily apparent that to enlarge an image of the size of the cathode ray tube fluorescent screens to the same size projected image, a catoptric optical system of Fig. 2 is of considerably smaller over-all dimensions than the corresponding system required in the apparatus of Fig. 1.

Figure 6:
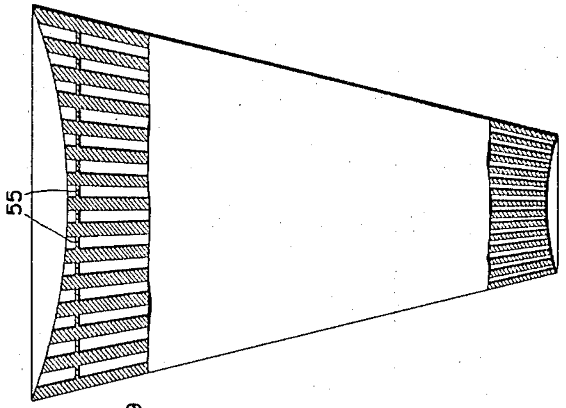
Figs. 4, 5 and 6 represent diagrammatically the essential steps in the process of forming the filamentary light conducting structure in accordance with the invention.

In accordance with another feature of the invention, there is provided a method of making a filamentary light conducting structure suitable for use in an optical system such as that described. For the purpose of illustration, this novel method will be described in connection with a structure such as that shown in Fig. 2 for effecting a reduction in size of an optical image without sacrificing any appreciable portion of the light energy available in the image. Accordingly, reference will now be made to Figs. 4, 5 and 6 of the drawings.

Figure 4:
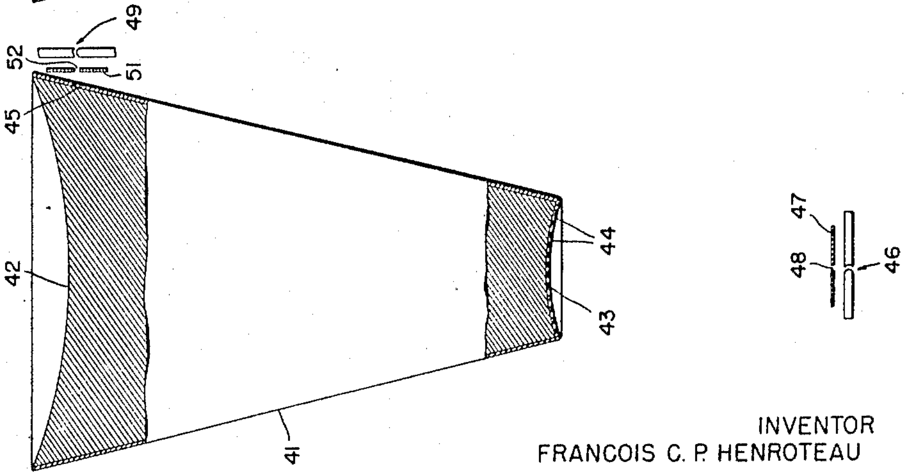

In Fig. 4, there is illustrated a form or container 41. In general, this container has a frustro-conical shape. The top 42 of this container has a curvature conforming to the curvature of the end wall of the cathode ray tube upon which is formed the fluorescent screen. The container top also is of substantially the same size as the end wall of the tube. The bottom 43 of the container has a configuration of the spherically shaped object surface member of the catoptric system with which the filamentary light conducting structure is to be used. The bottom of the container also is provided with a multiplicity of small perforations such as 44. The size of each of these perforations is substantially the same as the desired cross-sectional area of each of the light conducting filaments at the object surface of the catoptric system. There are provided at least as many of these perforations as there are elemental areas of the image to be transferred. The container 41 also is provided with a plurality of perforations such as 45 in the side walls thereof.

There also is provided a source of radiant energy such as the arc light 46 located below the container 41 substantially on the central axis of the container. Preferably, this radiant energy source is an arc capable of producing ultraviolet light of relatively high intensity. In conjunction with the radiant energy source 46, there also is provided a diaphragm 47 having an aperture 48 located between the source and the bottom 43 of the container and situated on the central axis of the container. A source of ultraviolet light 46, in conjunction with the aperture 48 of the diaphragm, provides a point source of high intensity radiant energy. Likewise, there is provided at least one other source 49 of radiant energy such as ultraviolet light and a diaphragm 51 having an aperture 52 located between this radiant energy source and the side wall aperture 45 of the container.

Figure 5:
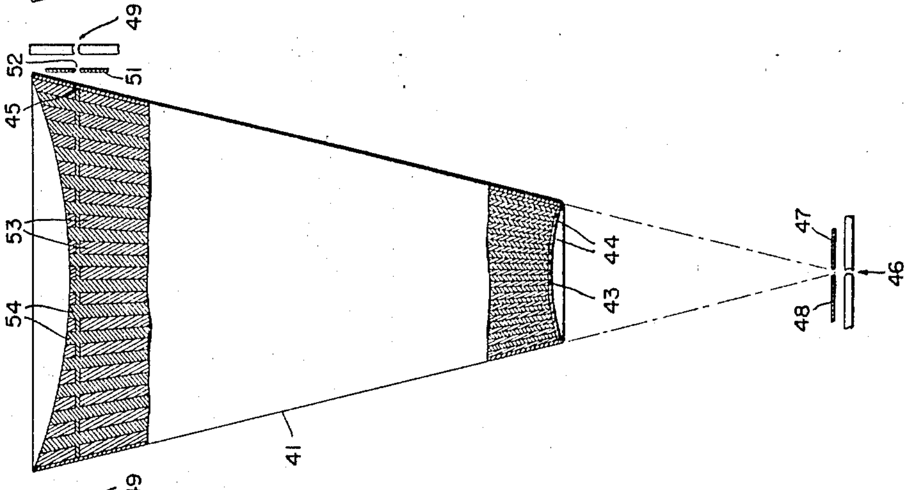

The container 41 is completely filled with a non-polymerized plastic such as cellulose tricrotonate which is soluble in a suitable solvent. Referring to Fig. 5, the radiant energy sources 46 and 49 are energized to project concentrated beams of ultraviolet light, for example, into the associated apertures of the container 41. The light beam, striking the perforated bottom 43 of this container, is broken up by the perforations such as 44 into a multiplicity of smaller light beams which travel through the non-polymerized plastic within the container. Each of the smaller ultraviolet light beams diverge in passing through the plastic substance within the container so as to expose filamentary portions such as 53 of the plastic material. The exposed portions of the plastic material thereby are polymerized. At the same time, unexposed portions such as 54 of the plastic material remain unpolymerized. At the same time, the projection of the ultraviolet light from the source 49 through the side wall apertures of the container 41 exposes a transverse section of the plastic material which thereby becomes polymerized.

Following the polymerization step described, the plastic material within the container 41 is subjected to a solvent for the unpolymerized plastic material. By this means, all unexposed portions of the plastic material are dissolved and carried away leaving the polymerized portions which form the desired filamentary light conducting structure. These light conducting filaments are held together in the desired positions by means of the polymerized lateral sections such as 55. Obviously, as many of these lateral sections as may be required to provide the necessary strength and rigidity to the structure may be formed as described.

While there have been described what are at present considered the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A television image projector comprising, a cathode ray tube having an image reproducing screen of predetermined surface area, a viewing screen of larger surface area than that of said cathode ray tube screen, an image enlarger consisting of a plurality of concentric substantially spherical light reflecting members for projecting an enlarged image upon said viewing screen, and also a substantially spherical object surface member concentric with said light reflecting members, and an image transferring device consisting of a multiplicity of light conducting filaments extending from said cathode ray tube screen to corresponding points on said object surface member.

2. A television image projector comprising, a cathode ray tube having an image reproducing screen, an image enlarger comprising a relatively small substantial spherical object surface member, a relatively large substantially spherical image surface member, a plurality of substantially spherical light reflecting members located in the light path between said object surface and said image surface members, all of said spherical surfaces having substantially the same center of curvature, and a filamentary image transferring device consisting of a multiplicity of light conducting filaments, at least one for every elemental area of the television image, said image transferring device being located with one end of said group of light conducting light filaments adjacent to said cathode ray tube screen and the other end adjacent to said object surface member.

3. A television image projector comprising, a cathode ray tube having an image reproducing screen of predetermined surface area, a substantially flat viewing screen having a surface area larger than that of said cathode ray tube screen, an image enlarger comprising a substantially spherical object surface member having an area approximately equal to that of said cathode ray tube screen, a substantially spherical image surface member having an area approximately equal to that of said viewing screen, a plurality of substantially spherical light reflecting members located in the light path between said object surface and said image surface members, all of said spherical surfaces having substantially the same center of curvature, a first image transferring device consisting of a multiplicity of light conducting filaments extending from said cathode ray tube screen to corresponding points on said object surface member, there being at least one of said filaments for every elemental area of the television image, and a second image transferring device consisting of a multiplicity of light conducting filaments extending from said image surface member to corresponding points of said viewing screen, there being at least one of said second group of filaments for every elemental area of the television image.

4. A television image projector comprising, a cathode ray tube having an image reproducing screen of predetermined surface area, a viewing screen of larger surface area than that of said cathode ray tube screen, an image enlarger having a substantially spherical object surface member of smaller surface area than that of said cathode ray tube screen and comprising a plurality of substantially spherical light reflecting members located between said object surface member and said viewing screen, all of said spherical surfaces having substantially the same center of curvature, and an image reducer consisting of a multiplicity of light conducting filaments arranged in a substantially conical formation and positioned with the end having the larger cross-sectional area adjacent to said cathode ray tube screen and with the end having the smaller cross-sectional area adjacent to said object surface member.

FRANÇOIS CHARLES PIERRE HENROTEAU.

REFERENCES CITED

The following references are of record in the file of this patent:

UNITED STATES PATENTS

| Number | Name | Date |
|---|---|---|
| 1,751,584 | Hansell | Mar. 20, 1930 |
| 2,122,750 | Nicolson | July 5, 1938 |
| 2,136,424 | Fields et al. | Nov. 15, 1938 |
| 2,172,775 | Schmidt-Ott et al. | Sept. 12, 1939 |
| 2,229,302 | Martin et al. | Jan. 21, 1941 |
| 2,273,801 | Landis | Feb. 17, 1942 |
| 2,295,802 | Nicoll | Sept. 15, 1942 |
| 2,307,211 | Goldsmith | Jan. 5, 1943 |
| 2,354,591 | Goldsmith | July 25, 1944 |
| 2,380,887 | Warmisham | July 31, 1945 |

FOREIGN PATENTS

| Number | Country | Date |
|---|---|---|
| 276,084 | Great Britain | Aug. 22, 1927 |
| 557,771 | Great Britain | Dec. 3, 1943 |